United States Patent
Chen et al.

(10) Patent No.: US 10,063,344 B2
(45) Date of Patent: Aug. 28, 2018

(54) METHOD AND DEVICE FOR SYMBOL DECISION AND DIGITAL RECEIVER

(71) Applicant: MStar Semiconductor, Inc., Hsinchu Hsien (TW)

(72) Inventors: Chia-Wei Chen, Hsinchu Hsien (TW); Yu-Che Su, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/485,327

(22) Filed: Apr. 12, 2017

(65) Prior Publication Data
US 2018/0097579 A1 Apr. 5, 2018

(30) Foreign Application Priority Data
Oct. 5, 2016 (TW) .............................. 105132160 A

(51) Int. Cl.
| | |
|---|---|
| H04L 1/00 | (2006.01) |
| H04L 25/06 | (2006.01) |
| H04L 25/03 | (2006.01) |
| H04L 27/38 | (2006.01) |

(52) U.S. Cl.
CPC .......... H04L 1/0036 (2013.01); H04L 1/0016 (2013.01); H04L 25/03885 (2013.01); H04L 25/061 (2013.01); H04L 27/3827 (2013.01)

(58) Field of Classification Search
CPC . H04L 1/0036; H04L 1/0016; H04L 27/3827; H04L 25/061; H04L 25/03885
See application file for complete search history.

(56) References Cited

U.S. PATENT DOCUMENTS

| | | | | |
|---|---|---|---|---|
| 2003/0103575 | A1* | 6/2003 | Birru ..................... | H04L 1/0057 375/265 |
| 2004/0184563 | A1* | 9/2004 | Bach ................... | H04L 27/3818 375/324 |
| 2005/0220220 | A1* | 10/2005 | Belotserkovsky .... | H04L 25/061 375/316 |
| 2008/0137765 | A1* | 6/2008 | Dalla Torre ...... | H04L 25/03006 375/261 |
| 2010/0166115 | A1* | 7/2010 | Hewavithana ...... | H04L 27/2273 375/329 |
| 2013/0336649 | A1 | 12/2013 | Essiambre et al. | |
| 2014/0147117 | A1* | 5/2014 | Kikuchi ............. | H04B 10/2507 398/65 |
| 2016/0366003 | A1* | 12/2016 | Kwon ................... | H04L 1/0001 |

FOREIGN PATENT DOCUMENTS

CN 1140520 A 1/1997

* cited by examiner

*Primary Examiner* — Kenneth Lam
(74) *Attorney, Agent, or Firm* — Edell, Shapiro & Finnan, LLC

(57) ABSTRACT

A symbol decision method includes: storing a look-up table (LUT) to a symbol decision circuit; receiving a first signal, and generating a coordinate signal set corresponding to the first signal according to the first signal, wherein the coordinate signal set is located in a first decision region; and reading the LUT according to the coordinate signal set to output a first symbol corresponding to the first signal, wherein the first symbol is a first constellation point corresponding to the first decision region.

17 Claims, 6 Drawing Sheets

METHOD AND DEVICE FOR SYMBOL DECISION AND DIGITAL RECEIVER

This application claims the benefit of Taiwan application Serial No. 105132160, filed Oct. 5, 2016, the subject matter of which is incorporated herein by reference.

BACKGROUND OF THE INVENTION

Field of the Invention

The invention relates in general to a symbol decision method, a symbol decision circuit and a digital receiving circuit, and more particularly to a symbol decision method, a symbol decision circuit and a digital receiving circuit for demodulating high-level modulation signals or irregular modulation signals.

Description of the Related Art

Digital communication systems are extensively applied in the daily life. Conventional digital communication systems mostly adopt regular modulation schemes, e.g., binary phase-shift keying (BPSK), quadrature phase-shift keying (QPSK), 16PSK, 64PSK and 64 quadrature amplitude modulation (64QAM) and 256QAM, to modulate signals. Because constellation points of a regular modulation scheme are arranged quite regularly on a constellation plane, a demodulator or a symbol decider (or referred to as a slicer) corresponding to such modulation scheme also has a simpler structure.

However, to accommodate the ever-increasing transmission speed demanded for communication systems, new-generation communication systems (e.g., a DVB S2X digital television system, an extension of Digital Video Broadcasting—Satellite Generation 2) adopt high-level modulation schemes or irregular modulation schemes to modulate signals (e.g., 256 amplitude and phase-shift keying (256APSK)). In other words, as constellation points of an irregular modulation scheme display an irregular arrangement on a constellation point, multiple magnitudes, phases, real/in-phase components or imaginary/quadrature components of transmitted symbols of an irregular modulation scheme do not present a regular corresponding relationship.

For example, FIG. 9 and FIG. 10 show schematic diagrams of a constellation plane including a plurality of constellation points of a regular modulation scheme and an irregular modulation scheme, respectively. For illustration purposes, FIG. 9 and FIG. 10 depict only a first quadrant of the constellation plane. As seen from FIG. 9, the constellation points of a regular modulation scheme display a regular arrangement on the constellation plane; that is, a plurality of magnitudes, phases, real/in-phase components or imaginary/quadrature components corresponding to a plurality of transmitted symbols (i.e., the plurality of constellation points) present a regular corresponding relationship. In contrast, as seen from FIG. 10, the plurality of constellation points of an irregular modulation scheme appear irregular (compared to FIG. 9).

Conventional solutions do not provide a corresponding demodulation method for an irregular modulation scheme. That is to say, a conventional digital receiver or symbol decider is incapable of correctly demodulating modulated signals transmitted from a transmitter, in a way that an error rate of the communication system is increased and the overall performance of the communication system is reduced.

Therefore, there is a need for a solution for demodulating irregular modulation signals.

SUMMARY OF THE INVENTION

The invention is directed to a symbol decision method, a symbol decision circuit and a digital receiving circuit for demodulating high-level modulation signals or irregular modulation signals to overcome issues of the prior art.

The present invention discloses a symbol decision method for determining a first symbol corresponding to a first signal. The symbol decision method includes: storing a look-up table (LUT) in a symbol decision circuit, wherein the LUT stores a corresponding relationship between a plurality of coordinates and a plurality of constellation points on a constellation plane, a plurality of first coordinates corresponding to the same constellation point form a decision region, the constellation plane includes a plurality of decision regions each corresponding to one constellation point, and a distribution of the plurality of constellation points on the constellation plane is associated with a modulation scheme of the first signal; receiving the first signal, and generating a coordinate signal set associated with the first signal according to the first signal, wherein the coordinate signal set corresponds to a first decision region among the plurality of decision regions; and reading the LUT according to the coordinate signal set to output a first symbol corresponding to the first signal, wherein the first symbol is a first constellation point corresponding to the first decision region.

The present invention further discloses a symbol decision circuit applied to a digital circuit. The symbol decision circuit includes: a coordinate circuit, receiving a first signal, and generating a coordinate signal set corresponding to the first signal, wherein the first signal includes a modulation signal modulated by a modulation scheme; and a look-up table (LUT) circuit, coupled to the coordinate circuit, storing an LUT, outputting a first symbol corresponding to the first signal according to the LUT and the coordinate signal set. The first modulation scheme includes a plurality of constellation points on a constellation plane, the LUT stores a corresponding relationship between a plurality of coordinates and the plurality of constellation points, a plurality of first coordinates corresponding to the same constellation point form a decision region, and the constellation plane includes a plurality of decision regions each corresponding to one constellation point.

The present invention further discloses a digital receiving circuit. The digital receiving circuit includes: an error feedback circuit, outputting a first signal according to a plurality of coefficients; a symbol decision circuit, coupled to the error feedback circuit, including a coordinate circuit that receives the first signal and generates a coordinate signal set corresponding to the first signal, wherein the first signal includes a signal modulated by a modulate scheme, and a look-up table (LUT) circuit that is coupled to the coordinate circuit, stores an LUT and outputs a first symbol corresponding to the first signal according to the LUT and the coordinate signal set, wherein the first modulation scheme includes a plurality of constellation points on a constellation plane, the LUT stores a corresponding relationship between a plurality of coordinates and the plurality of constellation points on the constellation plane, a plurality of first coordinates corresponding to the same constellation point form a decision region, and the constellation plane includes a plurality of decision regions each corresponding to one constellation point; and a subtraction circuit, coupled to the feedback circuit and the symbol decision circuit, generating an error signal. The error feedback circuit adjusts the plurality of coefficients according to the error signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
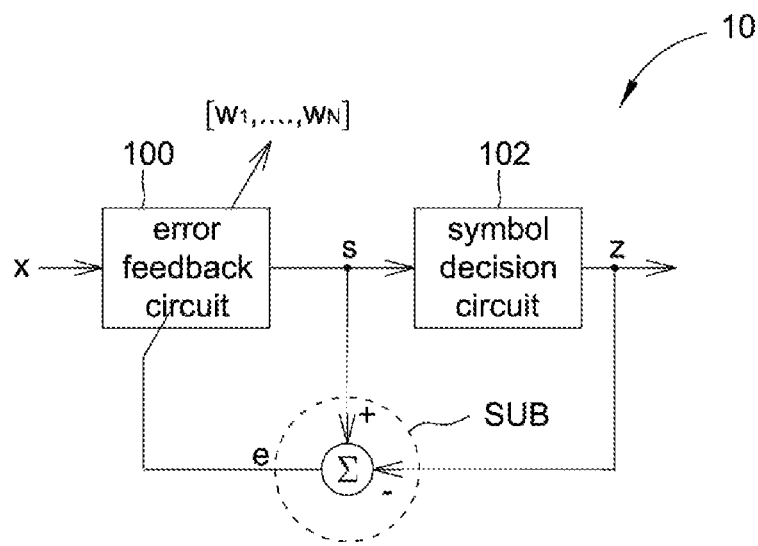
FIG. 1 is a block diagram of a digital receiving circuit according to an embodiment of the present invention.

FIG. 1 shows a block diagram of a digital receiving circuit 10 according to an embodiment of the present invention. As shown in FIG. 1, the digital receiving circuit 10 includes an error feedback circuit 100, a symbol decision circuit 102 and a subtraction circuit SUB. The error feedback circuit 100 includes an adaptive filter (not shown) that processes a signal x, i.e., processing the signal x according to coefficients $w_1$ to $w_N$, to output a first signal s. The symbol decision circuit 102 is a slicer, coupled to the error feedback circuit 100, receives the first signal s, and determines a first symbol z corresponding to the first signal s. The subtraction circuit SUB, coupled to the error feedback circuit 100 and the symbol decision circuit 102, generates an error signal e to the error feedback circuit 100. The error signal e may be a subtraction result of the first signal s and the first symbol z (i.e., e=s−z). The error feedback circuit 100 may adjust the coefficients $w_1$ to $w_N$ according to the error signal e. In one embodiment, the error feedback circuit 100 may be a feed-forward equalizer (FFE); accordingly, the digital receiving circuit 10 is an equalization circuit.

More specifically, the first signal s includes a signal modulated by a predetermined modulation scheme and a noise. The predetermined modulation scheme may be a regular modulation scheme or an irregular modulation scheme. For example, the regular modulation scheme may be a modulation scheme such as binary phase-shift keying (BPSK), quadrature phase-shift keying (QPSK), 16PSK, 64PSK, 64 quadrature amplitude modulation (64QAM) or 256QAM. That is to say, the plurality of constellation points of a regular modulation scheme display a regular arrangement on a constellation plane. For example, a plurality of magnitudes, phases, real/in-phase components, or imaginary/quadrature components corresponding to a plurality of transmitted symbols (i.e., a plurality of constellation points) (transmitted from a transmitter) present a regular corresponding relationship. In comparison, a plurality of magnitudes, phases, real/in-phase components, or imaginary/quadrature components corresponding to a plurality of constellation points corresponding to an irregular modulation present an irregular arrangement.

Figure 2:
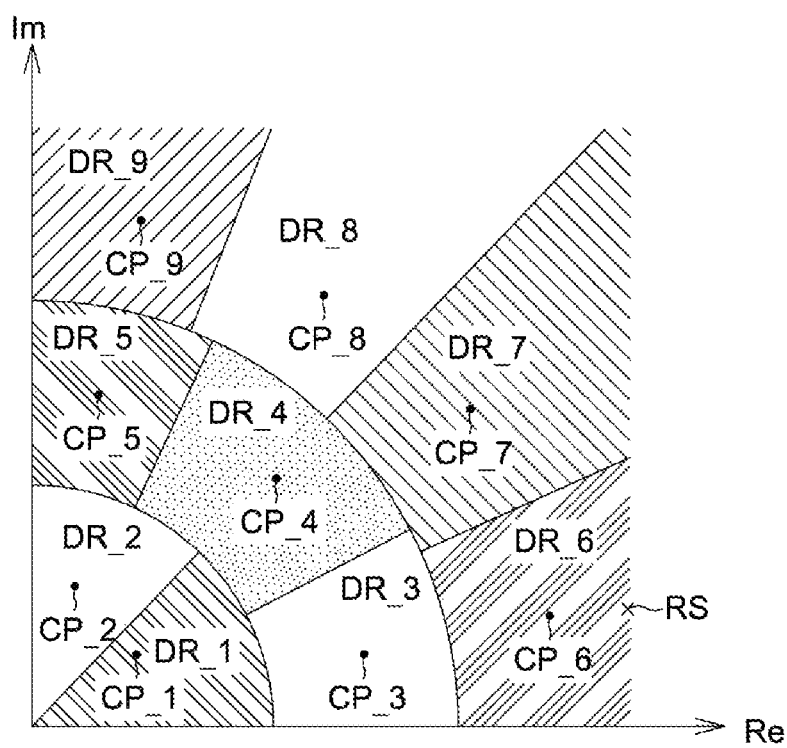
FIG. 2 is a schematic diagram of a constellation plane according to an embodiment of the present invention.

FIG. 2 shows a schematic diagram of a constellation plane 20 according to an embodiment of the present invention. FIG. 2 further depicts the distribution/arrangement of a plurality of constellation points CP_1 to CP_K associated with a modulation scheme MC. In an embodiment, the modulation scheme MC is an irregular modulation scheme, and the constellation plane 20 may be a complex number plane formed by a real-part axis Re and an imaginary-part axis Im. In practice, positive/negative signs of the constellation plane 20 are divided into a first quadrant, a second quadrant, a third quadrant and a fourth quadrant. For illustration purposes, FIG. 2 depicts only the first quadrant (including the constellation points CP_1 to CP_9 among the constellation points CP_1 to CP_K). In one embodiment, the first signal s may include a signal modulated by the modulation scheme MC. In the above situation, according to a coordinate position of the first signal s on the constellation plane 20, the symbol decision circuit 102 may output the first symbol z as the constellation point located closest to the coordinate position, i.e., outputting the first symbol z as the constellation point located closest to the first signal s (the coordinate position located). For example, assume that the first signal s is a coordinate position RS on the constellation plane 20 (as shown in FIG. 2), and the constellation point located closest to the coordinate position RS is the constellation point CP_6. Thus, the symbol decision circuit 102 outputs the first symbol z as the constellation point CP_6 after receiving the first signal s located at the coordinate position RS.

Further, the corresponding relationship between the coordinates and the constellation points CP_1 to CP_K on the constellation plane 20 may be stored in a look-up table LUT in advance. When the symbol decision circuit 102 receives the first signal s, the symbol decision circuit 102 may first read the look-up table LUT according to the coordinate position of the first signal s to output the first symbol z as the constellation point located closest to the first signal s (the coordinate position located).

In brief, the constellation plane 20 may be divided into a plurality of decision regions DR_1 to DR_K (only the decision regions DR_1 to DR_9 are depicted in FIG. 2), wherein a plurality of first constellation points in the decision region DR_k correspond to the constellation point CP_k (k=1 to 9). When the symbol decision circuit 102 determines according to the coordinate position of the first signal s that the first signal s belongs to the decision region DR_k (through the look-up table LUT), the symbol decision circuit 102 may output the first symbol z as the constellation point CP_k corresponding to the decision region DR_k. The corresponding relationship between the decision regions DR_1 to DR_K and the constellation points CP_1 to CP_K may be stored in the look-up table LUT; that is, the look-up table LUT stores the corresponding relationship between a plurality of coordinates and the constellation points CP_1 to CP_K on the constellation plane 20. A plurality of first coordinates in the decision region DR_k correspond to the constellation point CP_k; that is, the plurality of constellation points corresponding to the constellation point CP_k form the decision region DR_k.

Figure 3:
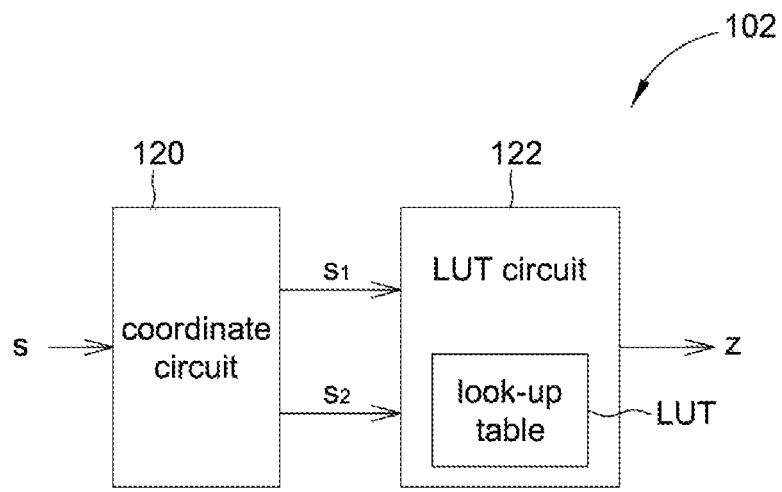
FIG. 3 is a block diagram of a symbol decision circuit according to an embodiment of the present invention.

FIG. 3 shows block diagram of the symbol decision circuit 102 according to an embodiment of the present invention. Referring to FIG. 3 showing the structure of the symbol decision circuit 102, the symbol decision circuit 102 includes a coordinate circuit 120 and an LUT circuit 122. The coordinate circuit 120 receives the first signal s, and generates a coordinate signal set $(s_1, s_2)$ of the first signal s on the constellation plane 20. The LUT circuit 122, coupled to the coordinate circuit 120, uses the coordinate signal set $(s_1, s_2)$ as an index pointer or an address needed for reading the look-up table LUT to output the first symbol z corresponding to the first signal s.

In one embodiment, the coordinate signal set $(s_1, s_2)$ may be represented by a coordinate expression of a rectangular coordinate system. That is to say, the first signal s may be expressed as $s=s_1+j_{s_2}$ or $s=s_I+j_{s_Q}$. As such, the coordinate signal $s_1$ may represent the in-phase component $s_I$ of the first signals s, and the coordinate signal $s_2$ may represent the quadrature component $s_Q$ of the first signal s; i.e., $s_1=s_I=$Re(s) and $s_2=s_Q=$Im(s), where Re(•) is a real-part operator and Im(•) is an imaginary-part operator.

The method for establishing the look-up table LUT is not limited. For example, distances between a plurality of coordinates and the constellation points CP_1 to CP_K on the constellation plane 20 may be first calculated, and a plurality of second coordinates near the constellation point CP_k are corresponded to the constellation point CP_k. More specifically, for the plurality of second coordinates corresponding to the constellation point CP_k, a distance d_k between each of the second coordinates and the constellation point CP_k is a minimum of a plurality of first distances d_1 to d_N between that coordinate and the constellation points CP_1 to CP_K. In other words, there are the plurality of first distances d_1 to d_N between that second coordinate and the constellation points CP_1 to CP_K, and the distance d_k between that second coordinate and the constellation point CP_k is d_k=min{d_1, ... d_N} (i.e., the distance d_k is the minimum distance). The plurality of first distances d_1 to d_N may be obtained through calculating norms between that second coordinate and the constellation points CP_1 to CP_K, wherein the norms may be Euclidean norms, absolute value norms, maximum norms, Manhattan norms or other I-p norms. Thus, the look-up table LUT stores all of the coordinates and the respective corresponding constellation points on the constellation plane 20, and the constellation point corresponding to each of the coordinates is the constellation point closest to that coordinate.

Figure 4:
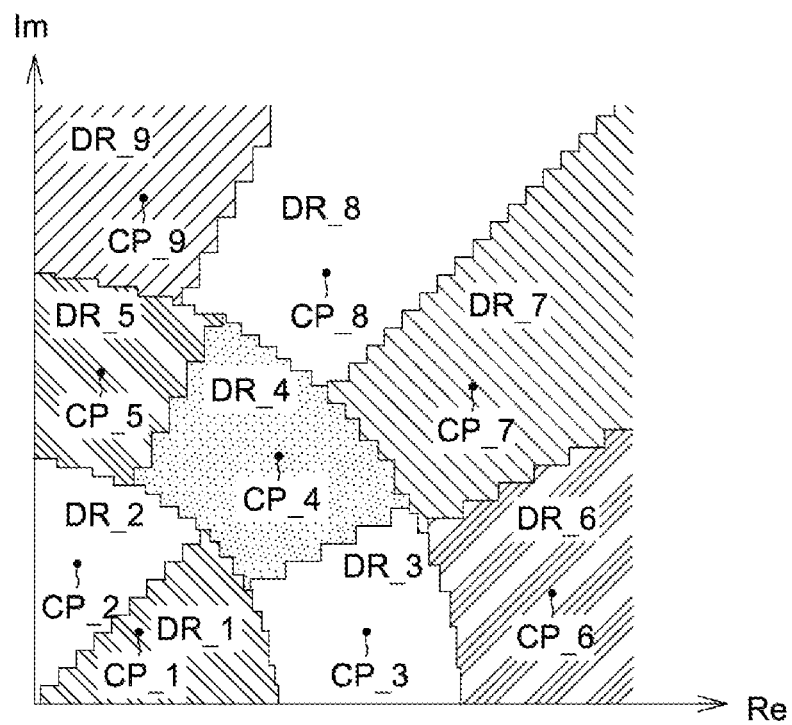
FIG. 4 is a schematic diagram of a plurality of decision regions according to an embodiment of the present invention.

In one embodiment, the symbol decision circuit 102 may represent the coordinate signal set $(s_1, s_2)$ by a digital method. For example, the symbol decision circuit 102 may use 6 bits to represent the magnitude value $|s_I|$ of the in-phase component $s_I$ and use 6 bits to represent the quadrature component $s_Q$. Taking the first quadrant of the constellation plane 20 for example, the real-part axis Re may be divided into $2^6$ intervals, and the imaginary-part axis Im may be similarly divided into $2^6$ intervals. Thus, the first quadrant of the constellation plane 20 may be divided into $2^6 \times 2^6 = 256$ (quantized) coordinates. Taking FIG. 2 for example, the look-up table LUT stores the corresponding relationship of 256 coordinates and the corresponding constellation points CP_1 to CP_9. It should be noted that, when the symbol decision circuit 102 uses a plurality of bits to represent the coordinate signal set $(s_1, s_2)$, a border between a decision region and another decision region may exhibit a zigzagged border (as shown in FIG. 4) instead of a smooth border shown in FIG. 2.

Figure 5:
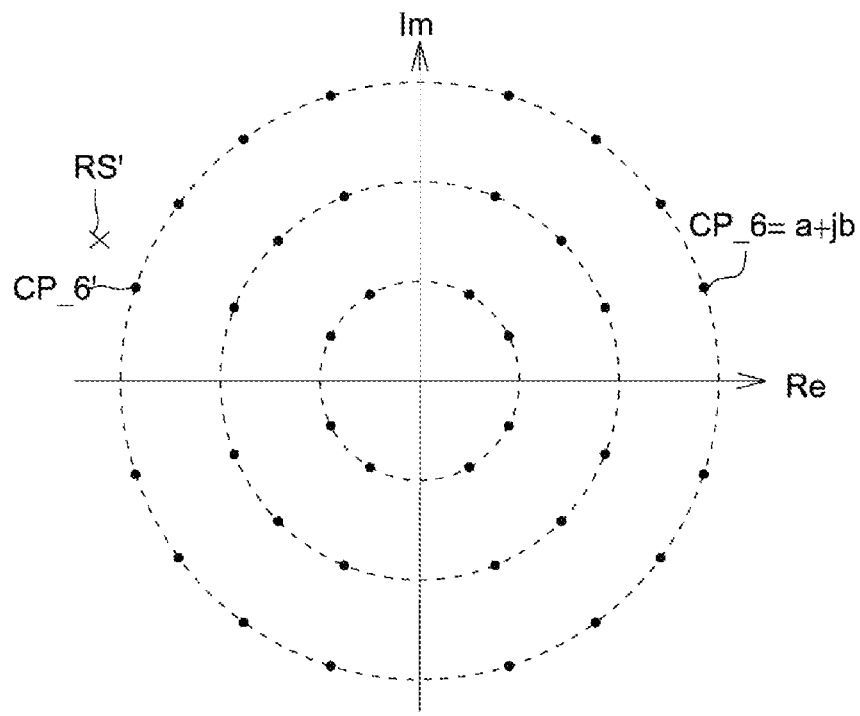
FIG. 5 is a schematic diagram of a plurality of constellation points according to an embodiment of the present invention.

When the number of bits that the symbol decision circuit 102 uses to represent the coordinate signal set $(s_1, s_2)$ gets larger, the border between a decision region and another decision region also becomes smoother, and the memory space that the look-up table LUT requires also becomes larger. To reduce the memory space that the look-up table LUT requires, symmetry characteristic of the modulation scheme MC is utilized. For example, FIG. 5 shows a schematic diagram of a plurality of constellation points of the modulation schemed MC on the constellation plane 20. As seen from FIG. 5, the distribution of the constellation points of the modulation scheme MC is symmetrical to the real-part axis Re as well as symmetrical to the imaginary-part axis Im. Given the symmetry characteristic that the modulation scheme MC provides, the look-up table LUT may store only the corresponding relationship between a plurality of coordinates in the first quadrant and a plurality of constellation points in the first quadrant. Further, the symbol decision circuit 102 may first determine the positive/negative signs of the coordinate signal $s_1$ and the coordinate signal $s_2$ (i.e., determining the positive/negative signs of the in-phase component $s_I$ and the quadrature component $s_Q$), read the look-up table LUT according to the magnitude value $|s_1|$ of the coordinate signal $s_1$ and the magnitude value $|s_2|$ of the coordinate signal $s_2$, apply the positive/negative signs of the coordinate signal $s_1$ and the coordinate signal $s_2$ to the first symbol z, and then output the first symbol z. For example, assume that a first signal s' that the symbol decision circuit 102 receives is located at a coordinate position RS' shown in FIG. 5, has coordinates $(s_1', s_2')$ and is located in the second quadrant. Thus, $(s_1', s_2')$ may be represented as $(-|s_1'|, +|s_2'|)$, and the look-up table LUT is read according to the magnitude value $|s_1|$ of the coordinate signal $s_1$ and the magnitude value $|s_2|$ of the coordinate signal $s_2$ to obtain the constellation point CP_6. In a condition where the constellation point CP_6 represents a signal a+jb, the symbol decision circuit 120 may output a first symbol z' as a'=−a+jb. Thus, the look-up table LUT needs to store only the corresponding relationship between a plurality of coordinates in the first quadrant and a plurality of constellation points in the first quadrant, whereas a plurality of coordinates and a plurality of constellation points of the remaining quadrants may be deduced through the positive/negative signs of the coordinate signal set of the first signal s, hence reducing the memory space that the look-up table LUT requires.

Figure 6:
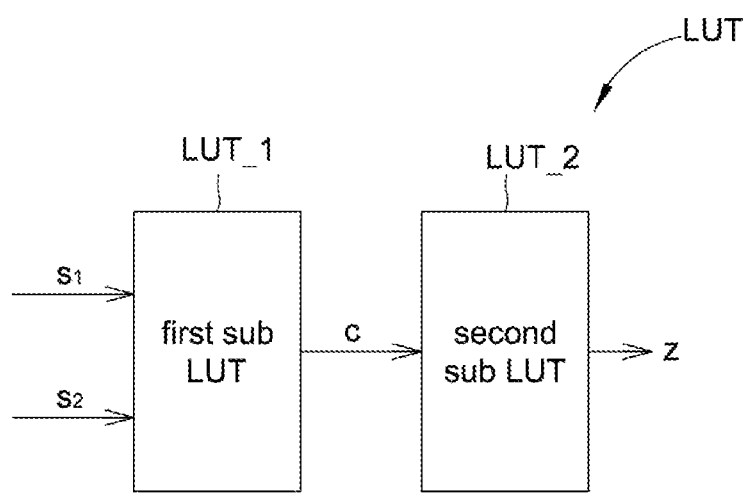
FIG. 6 is a schematic diagram of a look-up table (LUT) according to an embodiment of the present invention.

To further reduce the memory space that the look-up table LUT requires, the symbol decision circuit 102 may look up the first symbol corresponding to the first signal s through the foregoing indirect method; that is, the symbol decision circuit 102 first corresponds the first signal s to an index pointer c, and then corresponds the index pointer c to the first symbol z. More specifically, as shown in FIG. 6, the look-up table LUT may include a first sub look-up table LUT_1 and a second look-up table LUT_2. The first sub look-up table LUT_1 stores the corresponding relationship between a plurality of coordinates and a plurality of index pointers, and the second look-up table LUT_2 stores the corresponding relationship between the plurality of index pointers and a plurality of constellation points. Each of the index pointers corresponds to one constellation point. For example, when the first s is located at a coordinate position RS on the constellation plane 20 (shown in FIG. 2), the first sub look-up table LUT_1 may first correspond the first signal s to the index pointer c, which is an integer (e.g., an integer 6, i.e., c=6), and then the second look-up table LUT_2 may correspond the index pointer c to the constellation point CP_6 (the constellation point CP_6 represents the signal a+jb). Thus, the symbol decision circuit 102 may output the first symbol z as a+jb. In other words, the symbol decision circuit 102 may first read the first sub look-up table LUT_1 to learn that the first signal s corresponds to the index pointer c according to the coordinate signal set ($s_1$, $s_2$), and then read the second look-up table LUT_2 to learn that the index pointer c corresponds to the first symbol z according to the index pointer c. Because the index pointer c is in a data form of an integer, less memory space is occupied. Further, a+jb is usually in a data form of floating decimals, and more space is occupied. Therefore, by looking up the first symbol z corresponding to the first signal s through the foregoing indirect look-up table method, the memory space that the look-up table requires is reduced.

Figure 7:
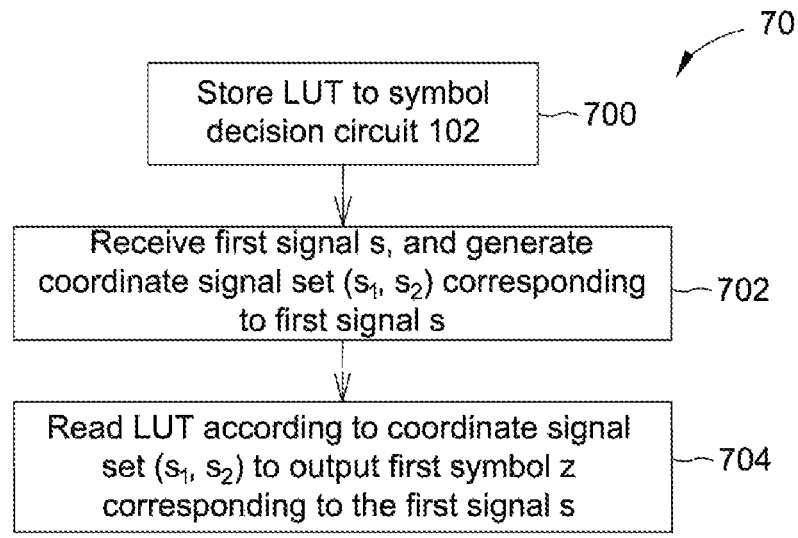
FIG. 7 is a flowchart of a symbol decision process according to an embodiment of the present invention.

Operations of the symbol decision circuit 102 in FIG. 1 may be concluded into a symbol decision process. FIG. 7 shows a flowchart of a symbol decision process 70 according to an embodiment of the present invention. The symbol decision process 70 may be performed by the symbol decision circuit 102 in FIG. 1, and includes following steps.

In step 700, the look-up table LUT is stored in the symbol decision circuit 102.

In step 702, the first signal s is received, and the coordinate signal set ($s_1$, $s_2$) corresponding to the first signal s is generated.

In step 704, and the look-up table LUT is read according to the coordinate signal set ($s_1$, $s_2$) to output the first symbol z corresponding to the first signal s.

Operation details of the symbol decision process 70 may be referred from the foregoing associated description, and shall be omitted herein.

As described in the above embodiments of the present invention, the corresponding relationship between a plurality of coordinates and a plurality of constellation points is stored in a look-up table LUT, and the symbol decision circuit 102 is capable of outputting the first symbol z corresponding to the first signal s only through reading the look-up table LUT after receiving the first signal s. Compared to the prior art, the present invention is capable of demodulating high-level modulation signals or irregular modulation signals, and is applicable to a digital television system (e.g., a DVB S2X CR20/30 system) to demodulate 256QPSK modulation signals in the DVB S2X system.

Figure 8:
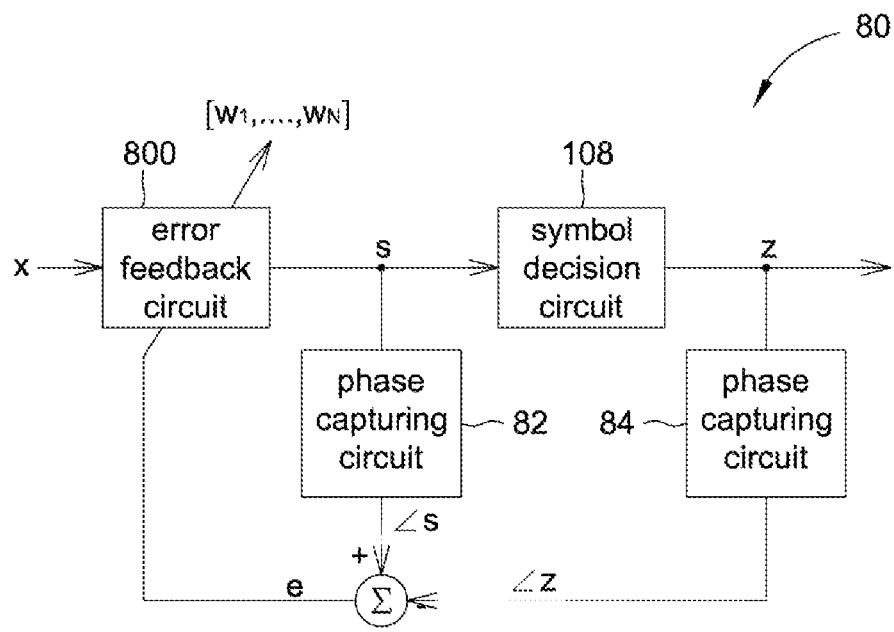
FIG. 8 is a block diagram of a digital receiving circuit according to an embodiment of the present invention.
Figure 9:
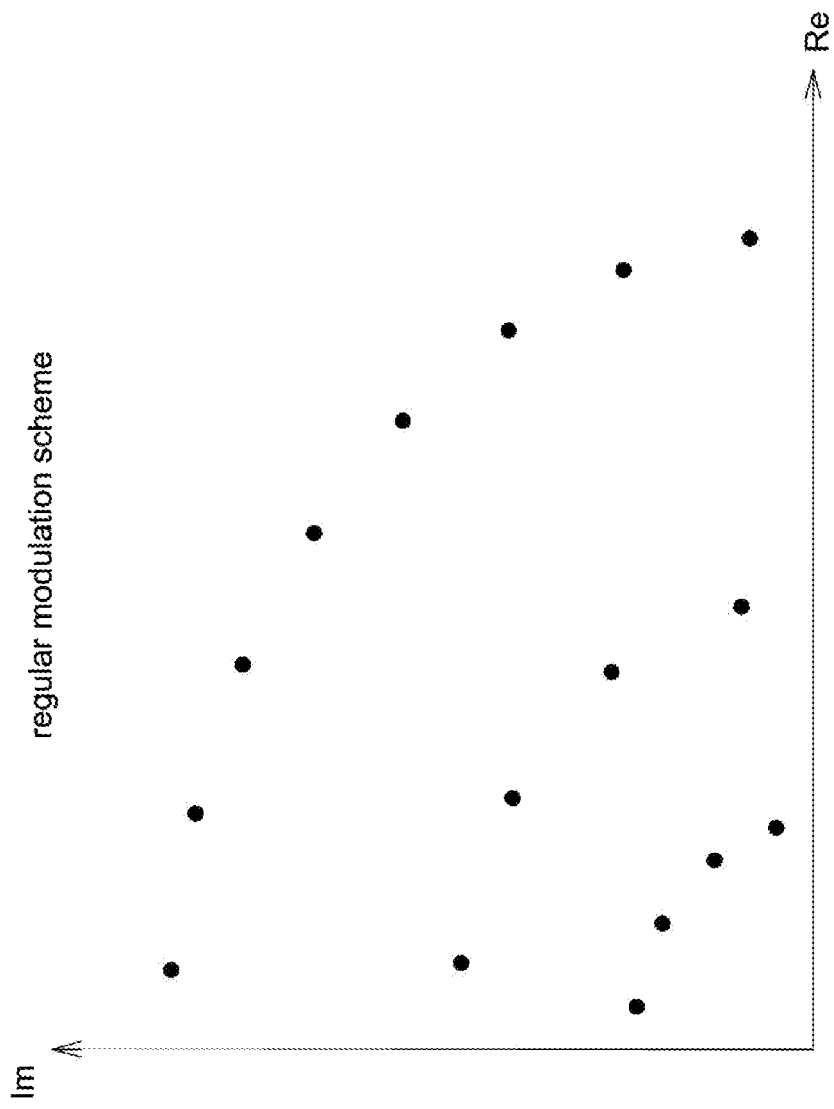
FIG. 9 is a schematic diagram of a plurality of constellation points of a regular modulation scheme.
Figure 10:
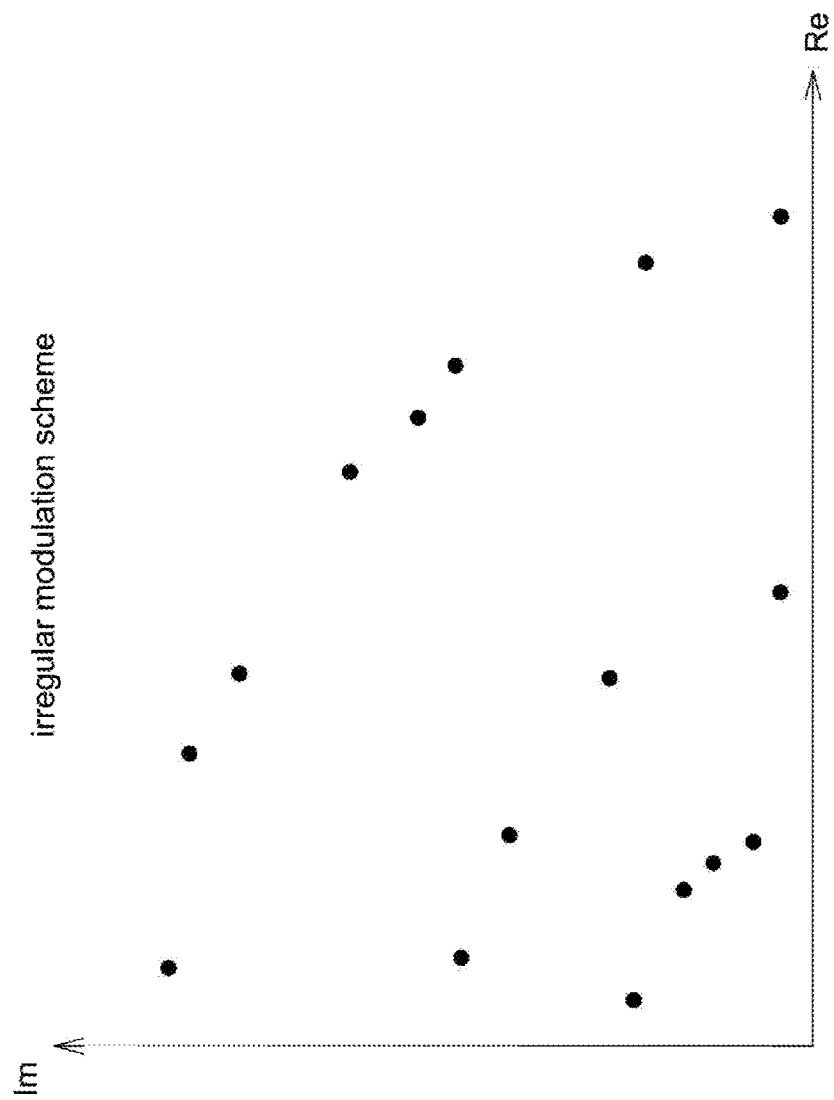
FIG. 10 is a schematic diagram of a plurality of constellation points of an irregular modulation scheme.

It should be noted that, the foregoing embodiments are for explaining the concept of the present invention, and modifications may be made thereto by one person skilled in the art. For example, the error feedback circuit of the digital receiving circuit may be a phase recovery circuit instead of the feedforward equalizer. FIG. 8 shows a block diagram of a digital receiving circuit 80 according to an embodiment of the present invention. The digital receiving circuit 80 is similar to the digital circuit 10, and so the same elements are similarly denoted. One difference of the digital receiving circuit 80 from the digital receiving circuit 10 is that, the digital receiving circuit 80 includes a error feedback circuit 800 and phase capturing circuits 82 and 84. The error feedback circuit 800 is a phase recovery circuit, and the error signal e is a subtraction result of a phase ∠s of the first signal s and a phase ∠z of the first symbol z (i.e., e=∠s−∠z). The requirement of the present invention is satisfied by having the error feedback circuit 100 adjust the coefficients $w_1$ to $w_N$ according to the error signals.

Further, the coordinate signal set ($s_1$, $s_2$) is not limited to a coordinate expression of a rectangular coordinate system. That is to say, assuming that the first signal s is expressed as s=|s|exp(j∠s), the coordinate signal $s_1$ may be a magnitude signal of the first signal, and the coordinate signal $s_2$ may be a phase signal ∠s of the first signal s, i.e., s1=|s| and s2=∠s. The requirement of the present invention is satisfied by having the error feedback circuit 100 read the look-up table according to the coordinate signal set ($s_1$, $s_2$) and output the first symbol z corresponding to the first signal s.

One person skilled in the art can understand that the function units/circuits in FIG. 1, FIG. 3, FIG. 6 and FIG. 8 may be realized or implemented by digital circuits (e.g., an RTL circuit) or digital processing circuits, and such details are omitted herein.

In conclusion, in the present invention, the corresponding relationship between a plurality of coordinates and a plurality of constellation points is stored in a look-up table, and the symbol decision circuit is capable of outputting the first symbol corresponding to the first signal only through reading the look-up table after receiving the first signal. Compared to the prior art, the present invention is applicable to the demodulation of high-level modulation signals or irregular modulation signals.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A symbol decision method operating in a digital receiving circuit, for determining a first symbol corresponding to a first signal, comprising:
    storing a look-up table (LUT) to a symbol decision circuit, wherein the LUT stores a corresponding relationship between a plurality of coordinates and a plurality of constellation points on a constellation plane, a plurality of coordinates corresponding to the same constellation point form a decision region, the constellation plane comprises a plurality of decision regions each corresponding to one constellation point, and a distribution of the plurality of constellation points is associated with a modulation scheme of the first signal;
    receiving the first signal, and generating a coordinate signal set corresponding to the first signal according to the first signal, wherein the coordinate signal set is located in a first decision region among the plurality of decision regions; and
    reading the LUT according to the coordinate signal set to output the first symbol corresponding to the first signal, wherein the first symbol is a first constellation point corresponding to the first decision region,
    wherein the step of reading the LUT according to the coordinate signal set to output the first symbol corresponding to the first signal comprises:
    reading a first sub LUT of the LUT according to the coordinate signal set to output an index pointer; and
    reading a second sub LUT of the LUT according to the index pointer to output the first symbol according to the first signal.

2. The symbol decision method according to claim 1, further comprising:
    establishing the LUT.

3. The symbol decision method according to claim 2, wherein the step of establishing the LUT comprises:
- calculating distances between the plurality of coordinates and the plurality of constellation points on the constellation plane; and
- corresponding a plurality of second coordinates among the plurality of coordinates to a second constellation point, wherein between each of the plurality of second coordinates and the plurality of constellation points are a plurality of first distances, between each of the second coordinates and the second constellation point is a first minimum distance, and the first minimum distance is a minimum value of the plurality of first distances.

4. The symbol decision method according to claim 1, wherein the coordinate signal set is an in-phase signal and a quadrature signal of the first signal.

5. The symbol decision method according to claim 1, wherein the coordinate signal set is a magnitude signal and a phase signal of the first signal.

6. The symbol decision method according to claim 1, wherein the modulation scheme is an irregular modulation scheme.

7. The symbol decision method according to claim 1, wherein the modulation scheme is amplitude phase-shift keying (APSK) modulation.

8. The symbol decision method according to claim 1, wherein the number of the plurality of constellation points corresponding to the modulation scheme is greater than or equal to 32.

9. A symbol decision circuit, applied to a digital receiving circuit, comprising:
- a coordinate circuit, receiving a first signal, and generating a coordinate signal set corresponding to the first signal, wherein the first signal comprises a signal modulated by a modulation scheme;
- a look-up table (LUT) circuit, coupled to the coordinate circuit, storing an LUT, outputting a first symbol corresponding to the first signal according to the LUT and the coordinate signal set;
- wherein, the first modulation scheme comprises a plurality of constellation points on a constellation plane, the LUT stores a corresponding relationship between a plurality of coordinates and the plurality of constellation points on the constellation plane, a plurality of first coordinates corresponding to the same constellation points form a decision range, and the constellation plane comprises a plurality of decision ranges each corresponding to one constellation point,
- wherein the LUT comprises:
- a first sub LUT, outputting an index pointer according to the coordinate signal set; and
- a second sub LUT, outputting the first symbol corresponding to the first signal according to the index pointer.

10. The symbol decision circuit according to claim 9, wherein the LUT corresponds a plurality of second coordinates on the constellation plane to a second constellation point, between each of the plurality of second coordinates and the plurality of constellation points are a plurality of first distances, between each of the second coordinates and the second constellation point is a first minimum distance, and the first minimum distance is a minimum value of the plurality of first distances.

11. The symbol decision circuit according to claim 9, wherein the coordinate signal set generated by the coordinate circuit is an in-phase signal and a quadrature signal of the first signal.

12. The symbol decision circuit according to claim 9, wherein the coordinate signal set generated by the coordinate circuit is magnitude signal and a phase signal of the first signal.

13. The symbol decision circuit according to claim 9, wherein the modulation scheme is an irregular modulation scheme.

14. The symbol decision circuit according to claim 9, wherein the modulation scheme is amplitude phase-shift keying (APSK) modulation.

15. The symbol decision circuit according to claim 9, wherein the number of the plurality of constellation points corresponding to the modulation scheme is greater than or equal to 32.

16. A digital receiving circuit, comprising:
- an error feedback circuit, outputting a first signal according to a plurality of coefficients;
- a symbol decision circuit, coupled to the error feedback circuit, comprising:
  - a coordinate circuit, receiving a first signal, and generating a coordinate signal set corresponding to the first signal, wherein the first signal comprises a signal modulated by a modulation scheme;
  - a look-up table (LUT) circuit, coupled to the coordinate circuit, storing an LUT, outputting a first symbol corresponding to the first signal according to the LUT and the coordinate signal set;
  - wherein, the first modulation scheme comprises a plurality of constellation points on a constellation plane, the LUT stores a corresponding relationship between a plurality of coordinates and the plurality of constellation points on the constellation plane, a plurality of first coordinates corresponding to the same constellation points form a decision range, and the constellation plane comprises a plurality of decision ranges each corresponding to one constellation point; and
- a subtraction circuit, coupled to the error feedback circuit and the symbol decision circuit, generating an error signal;
- wherein, the error feedback circuit adjusts the plurality of coefficients according to the error signal, and
- wherein the error feedback circuit is a phase recovery circuit, and the error signal is a subtraction result between a phase of the first signal and a phase of the first symbol.

17. The digital receiving circuit according to claim 16, wherein the error feedback circuit is a feed-forward equalizer, and the error signal is a subtraction result of the first signal and the first symbol.

* * * * *